(12) United States Patent
Ohnishi (10) Patent No.: US 6,233,145 B1
(45) Date of Patent: *May 15, 2001

(54) FUNCTION EXTENDING APPARATUS FOR INFORMATION PROCESSING DEVICE

(75) Inventor: Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,058

(22) Filed: Mar. 21, 2000

Related U.S. Application Data (62) Division of application No. 08/840,460, filed on Apr. 18, 1997.

(30) Foreign Application Priority Data

Nov. 5, 1996 (JP) .................................................. 8-293003

(51) Int. Cl.[7] ...................................................... G06F 1/16
(52) U.S. Cl. ........................ 361/686; 361/726; 361/754; 361/801; 439/152
(58) Field of Search ................................... 361/684–686, 361/725–726, 732, 740, 747, 754, 748, 801; 439/152, 157, 352, 377, 379; 364/708.1

(56) References Cited

U.S. PATENT DOCUMENTS

| 4,659,159 | 4/1987 | Takahashi | 339/119 |
|---|---|---|---|
| 5,436,792 | 7/1995 | Leman et al. | 361/686 |
| 5,557,562 | 9/1996 | Yoshiharau et al. | 364/708.1 |
| 5,619,397 | 4/1997 | Honda et al. | 361/686 |
| 5,619,398 | 4/1997 | Harrison et al. | 361/686 |
| 5,627,727 | 5/1997 | Aguilera et al. | 361/686 |
| 5,684,673 | 11/1997 | Shibasaki et al. | 361/726 |
| 5,687,060 | 11/1997 | Ruch et al. | 361/686 |
| 5,737,541 | 4/1998 | Shimizu et al. | 361/725 |
| 5,751,546 | 5/1998 | Clark et al. | 361/686 |
| 5,751,547 | 5/1998 | Honda et al. | 361/686 |
| 5,790,375 | 8/1998 | Lee | 361/686 |
| 5,805,412 | 9/1998 | Yanagisawa et al. | 361/686 |
| 5,825,616 | 10/1998 | Howell et al. | 361/684 |
| 5,862,036 | 1/1999 | Lin | 361/686 |
| 5,886,869 | * 3/1999 | Fussell et al. | 361/685 |
| 8,840,460 | 4/1997 | Ohniski . | |

FOREIGN PATENT DOCUMENTS

| 2-163811 | 6/1990 | (JP) . |
|---|---|---|
| 7-104884 | 4/1995 | (JP) . |
| 7-257774 | 10/1995 | (JP) . |
| 7-319584 | 12/1995 | (JP) . |
| 8-095669 | 4/1996 | (JP) . |
| 8-115144 | 5/1996 | (JP) . |
| 8-147068 | 6/1996 | (JP) . |

* cited by examiner

Primary Examiner—Leo P. Picard
Assistant Examiner—Hung Van Duong
(74) Attorney, Agent, or Firm—Staas & Halsey LLP (57) ABSTRACT

A function of the extending apparatus for an information processing device including at least one connector provided on a surface of the function extending apparatus for mounting the information processing device, and connected with a corresponding connector provided on a lower surface of the information processing device, when the information processing device is mounted on the function extending apparatus. The function extending apparatus includes a pushing member moved in an upper direction so as to push the information processing device up from the function extending apparatus, a rotatable operation member, and a push-up mechanism which moves the pushing member in the upper direction, when the operation member is rotated.

6 Claims, 11 Drawing Sheets

FUNCTION EXTENDING APPARATUS FOR INFORMATION PROCESSING DEVICE

This application is a division of Ser. No. 08/840,460, filed Apr. 18, 1997.

BACKGROUND OF THE INVENTION

1. Field of the Invention

The present invention generally relates to a function extending apparatus for information processing devices, and more particularly, to a function extending apparatus for an information processing device having a detachment mechanism for dislodging the apparatus from the information processing device safely and stably.

2. Description of the Related Art

Recently, the use of a portable device having a CPU associated with memories and carrying out various processes such as information processing has been greatly increased. Accordingly, the use of a function extending apparatus for such a portable information processing device, which is optionally associated with the information processing device has also been increased. The function extending apparatus possesses functions which are not provided with the information processing device, and is attached to the information processing device when the functions contained in the function extending apparatus are desired. Therefore, it is preferable that the function extending apparatus has a structure by which it is easily attached to and separated from the information processing apparatus.

Figures 1, 1A:
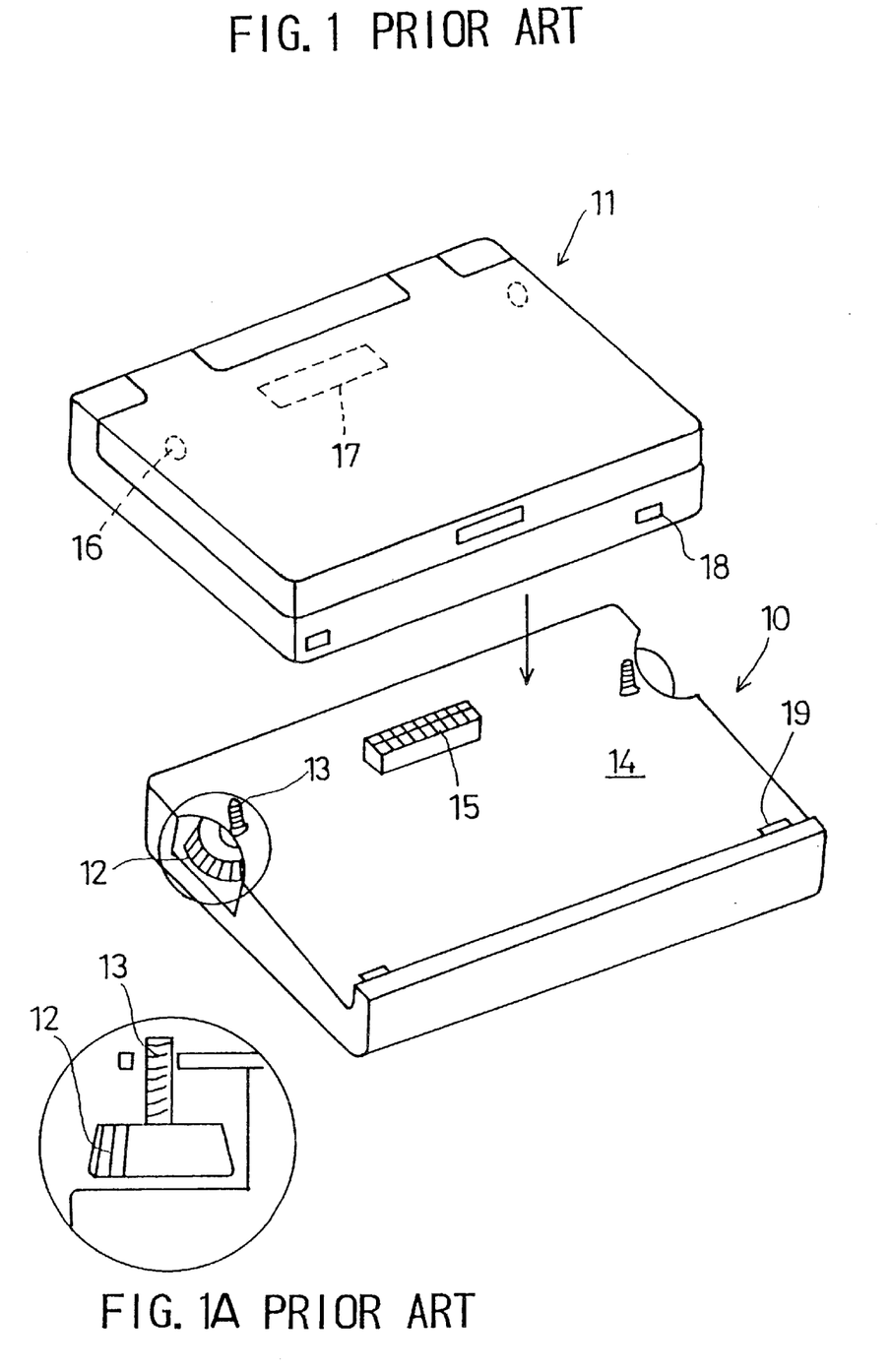
FIG. 1 is a diagram showing a conventional function extending apparatus together with a notebook-type portable information processing device.
FIG. 1A is an enlarged view of the knob/screw combination shown in FIG. 1.

FIGS. 1–1A are diagram showing a conventional function extending apparatus 10 together with a notebook-type portable information processing device 11.

In FIG. 1, the function extending apparatus 10 includes knobs 12, screw portions 13, an upper surface 14, a connector 15, and projecting portions 19. The knobs 12, located on right and left sides, respectively, of the apparatus 10, are provided with the screw portion 13 as indicated in FIG. 1A, and the screw portion 13 is projected from the upper surface 14 of the function extending apparatus 10. The connector 15 is provided on the upper surface 14 of the function extending apparatus 10.

Also, as shown in FIG. 1, the information processing device 11 has screw holes 16, each of which is located at a position corresponding to the screw portion 13 of the knobs 12, and a connector 17, which is engaged with the connector 15 of the function extending apparatus 10, provided on a lower surface of the device 11. In addition, holes 18 are provided on a side surface of the information processing device 11.

The information processing device 11 may be used singularly or in combination with the function extending apparatus 10. When the device 11 is used with the function extending apparatus 10, each of the holes 18 of the information processing device 11 is engaged with the respective projecting portion 19 and then the connector 17 of the device 11 is engaged with the connector 15 of the apparatus 10. After that, each of the knobs 12 is rotated a certain number of times so that the respective screw portion 13 may be driven into the screw hole 16. In this manner, the function extending apparatus 10 is attached to the information processing device 11.

When the function extending apparatus 10 is dislodged from the information processing device 11, each of the knobs 12 is rotated a certain number of times so that the respective screw portion 13 is unscrewed from the screw hole 16 and the connector 15 is separated from the connector 17 by applying a force to the function extending apparatus 10 and the information processing device 11.

However, the number of pins used in the connector 15 (or connector 17) has been increased in accordance with an improvement in function of the function extending apparatus 10. For instance, the number of pins used to be about 26 in a normal connector but it is increased to about 200 these days. Thus, as a consequence, a large force of about 2–4 kg is required for disconnecting a connecter of a function extending apparatus from a connector of an information processing device, and hence it is not easy to separate the function extending apparatus from the information processing device.

Also, if such a strong force is applied to the connectors of the function extending apparatus and the information processing device in a faulty manner when the apparatus and the device are separated, there is a danger that the connectors of both may be damaged.

SUMMARY OF THE INVENTION

Accordingly, it is a general object of this invention to provide a function extending apparatus in which the above-mentioned problems are eliminated.

A more specific object of the present invention is to provide a function extending apparatus which may prevent a destruction of connectors provided with the apparatus and the information processing device.

Another object of the present invention is to provide a detachment mechanism for detaching a connector of a function extending apparatus which may be easily and readily operated by a user.

The objects described above are achieved by a function extending apparatus for an information processing device, including at least one connector, which connector is provided on a mounting surface of the function extending apparatus for mounting the information processing device, to be connected with at least one corresponding connector of the information processing device, which connector is provided on a lower surface of the information processing device, the connector of the function extending apparatus being connected to the connector of the information processing device when the information processing device is mounted on the function extending apparatus, the function extending apparatus comprising a pushing member which is moved in an upper direction so as to push up the information processing device mounted on the function extending apparatus from the function extending apparatus, an operation member which is operated to separate the information processing device from the function extending apparatus, and a push-up mechanism which moves the pushing member in the upper direction in connection with the operation of the operation member.

The objects described above are also achieved by the function extending apparatus for an information processing device, wherein the push-up mechanism moves the pushing member at a height sufficient for disconnecting the connector of the information processing device from the connector of the function extending apparatus.

According to the above function extending apparatus for an information processing device, since a pushing member moved in an upper direction so as to push up the information processing device from the function extending apparatus, an operation member operated to separate the information processing device from the function extending apparatus, and a push-up mechanism which moves the pushing member in the upper direction in connection with the operation of the operation member are provided and the push-up mechanism may move the pushing member at a height sufficient for disconnecting the connector of the information processing device from that of the function extending apparatus, the disconnection operation for the connectors may be easily performed by operating the operation member with no necessity to apply a strong force. Therefore, the information processing device may be separated from the function extending apparatus by simply holding up the device after the operation of the operation member. That is, the operation is simplified compared with a conventional function extending apparatus, in which screws are required to be unscrewed to separate it from an information processing device, and the operability of the step may be improved.

The objects described above are achieved by a function extending apparatus for an information processing device, including at least one connector, which connector is provided on a mounting surface of the function extending apparatus for mounting the information processing device, to be connected with at least one corresponding connector of the information processing device, which connector is provided on a lower surface of the information processing device, the connector of the function extending apparatus being connected to the connector of the information processing device when the information processing device is mounted on the function extending apparatus, the function extending apparatus comprising a locking mechanism which is capable of locking the function extending apparatus with the information processing device, an operation member which is operated to separate the information processing device from the function extending apparatus, and a locking release mechanism which is capable of releasing a locking state generated by the locking mechanism in connection with the operation of the operation member.

According to the above function extending apparatus for an information processing device, since a locking mechanism, an operation member operated to separate the information processing device from the function extending apparatus, and a locking release mechanism are provided, the function extending apparatus may be easily locked with the information processing device by the locking mechanism and the locking state generated by the locking mechanism may be readily released by the locking release mechanism which may be operated by the operation of the operation member. Thus, the information processing device may be separated from the function extending apparatus by simply holding up the device after the operation of the operation member, and operability of the apparatus may be improved.

The objects described above are achieved by a function extending apparatus for an information processing device, including at least one connector, which connector is provided on a mounting surface of the function extending apparatus for mounting the information processing device, to be connected with at least one corresponding connector of the information processing device, which connector is provided on a lower surface of the information processing device, the connector of the function extending apparatus being connected to the connector of the information processing device when the information processing device is mounted on the function extending apparatus, the function extending apparatus comprising a locking mechanism which is capable of locking the function extending apparatus with the information processing device, a pushing member which is moved in an upper direction so as to push up the information processing device mounted on the function extending apparatus from the function extending apparatus, an operation member which is operated to separate the information processing device from the function extending apparatus, a locking release mechanism which is capable of releasing a locking state generated by the locking mechanism in connection with the operation of the operation member, and a push-up mechanism which moves the pushing member in the upper direction in connection with the operation of the operation member after the locking release mechanism is actuated in connection with the operation of the operation member.

The objects described above are also achieved by the function extending apparatus for an information processing device, wherein the push-up mechanism moves the pushing member at a height sufficient for disconnecting the connector of the information processing device from the connector of the function extending apparatus.

According to the above function extending apparatus for an information processing device, since a locking mechanism, a pushing member moved in an upper direction so as to push up the information processing device from the function extending apparatus, an operation member operated to separate the information processing device from the function extending apparatus, a locking release mechanism, and a push-up mechanism which moves the pushing member in the upper direction in connection with the operation of the operation member after the locking release mechanism is actuated in connection with the operation of the operation member are provided and the push-up mechanism may move the pushing member at a height sufficient for disconnecting the connector of the information processing device from that of the function extending apparatus, the locking state of the device and the apparatus is released first, upon operation of the operating member, by the locking release mechanism and then the disconnection operation for the connectors may be easily performed by operating the operation member further with no necessity to apply a strong force. Therefore, the information processing device may be separated from the function extending apparatus by simply holding up the device after the operation of the operation member. Thus, the operation is simplified compared with a conventional function extending apparatus, in which screws are required to be unscrewed to separate it from an information processing device, and the operability of the separation step may be improved.

The objects described above are also achieved by the function extending apparatus for an information processing device, wherein each of the pushing member, operation member and push-up mechanism is provided at a right side and a left side of the function extending apparatus, each of the right and left operation members is comprised of a lever portion which may be pulled in a side direction, each of the right and left push-up mechanisms is comprised of a pushing cam which is located in the vicinity of a rotary center of the right and left lever portions, respectively, and each of the right and left pushing members is located symmetrically with respect to the connector of the function extending apparatus.

According to the above function extending apparatus for an information processing device, since each of the pushing member, operation member and push-up mechanism is provided at a right side and a left side of the function extending apparatus and each of the right and left operation members is comprised of a lever portion which may be pulled in a side direction, an operator may perform a separating operation by simply pulling the right and the left lever portions in the respective side directions with a mild force. Thus, the operability of the process may be improved.

Also, since each of the right and left push-up mechanisms is comprised of a pushing cam which is located in the vicinity of a rotary center of the right and left lever portions, respectively, it is possible to push up the pushing member in the upper direction with a force stronger than the force necessary for disconnecting the connector of the information processing device from the connector of the function extending apparatus by simply pulling the lever portion of the respective operation members. Moreover, since each of the right and left pushing members is located symmetrically with respect to the connector of the function extending apparatus, the entire body of the connector of the information processing device may be pulled out evenly from the connector of the function extending apparatus in a stable and a safe condition without damaging the connectors.

The objects described above are also achieved by the function extending apparatus for an information processing device, wherein each of the locking mechanism, operation member and locking release mechanism is provided at a right side and a left side of the function extending apparatus, and each of the right and left operation members is comprised of a lever portion which may be pulled in a side direction.

According to the above function extending apparatus for an information processing device, since each of the locking mechanism, operation member and a locking release mechanism is provided at a right side and a left side of the function extending apparatus, and each of the right and left operation members is comprised of a lever portion which may be pulled in a side direction, an operator may perform a separating operation by simply pulling the right and the left lever portions in the respective side directions with a mild force. Thus, the operability of the process may be improved.

The objects described above are also achieved by the function extending apparatus for an information processing device, wherein each of the locking mechanism, pushing member, operation member, locking release mechanism and push-up mechanism is provided at a right side and a left side of the function extending apparatus, each of the right and left operation members is comprised of a lever portion which may be pulled in a side direction, each of the right and left push-up mechanisms is comprised of a pushing cam which is located in the vicinity of a rotary center of the right and left lever portions, respectively, and each of the right and left pushing members is located symmetrically with respect to the connector of the function extending apparatus.

According to the above function extending apparatus for an information processing device, since each of the locking mechanism, pushing member, operation member, locking release mechanism and push-up mechanism is provided at a right side and a left side of the function extending apparatus and each of the right and left operation members is comprised of a lever portion which may be pulled in a side direction, an operator may perform a separating operation by simply pulling the right and the left lever portions in the respective side directions with a mild force. Thus, the operability of the process may be improved. Also, since each of the right and left push-up mechanisms is comprised of a pushing cam which is located in the vicinity of a rotary center of the right and left lever portions, respectively, it is possible to push up the pushing member in the upper direction with a force stronger than the force necessary for disconnecting the connector of the information processing device from the connector of the function extending apparatus by simply pulling the lever portion of the respective operation members. Moreover, since each of the right and left pushing members is located symmetrically with respect to the connector of the function extending apparatus, the entire body of the connector of the information processing device may be pulled out evenly from the connector of the function extending apparatus in a stable and a safe condition without damaging the connectors.

The objects described above are also achieved by the function extending apparatus for an information processing device, wherein the locking release mechanism is comprised of a locking release cam, which may be integrally formed with the operation member and moves the locking mechanism in a direction releasing a lock of the locking mechanism upon operation of the operation member, and the locking release cam has a structure which allows the movement of the locking mechanism in the direction releasing the lock so as to make no movement of the operation member when the information processing device is mounted on the function extending apparatus.

According to the above function extending apparatus for an information processing device, since the locking release mechanism is comprised of a locking release cam, which may move the locking mechanism in a direction releasing a lock of the locking mechanism upon operation of the operation member, and the locking release cam has a structure which allows the movement of the locking mechanism in the direction releasing the lock so as to make no movement of the operation member when the information processing device is mounted on the function extending apparatus, only the locking mechanism moves a little when the information processing apparatus is mounted on the function extending apparatus and the operation member does not move. Thus, no discomfort is given to an operator.

Other objects and further features of the present invention will be apparent from the following detailed description when read in conjunction with the accompanied drawings.

DESCRIPTION OF THE PREFERRED EMBODIMENTS

In the following, a principle and an embodiment of the present invention will be described with reference to the accompanying drawings.

First, a description will be given of an embodiment of a function extending apparatus 30 for an information processing device according to the present invention shown in FIGS. 2 and 3.

The function extending apparatus 30 shown in the figures may be used with an information processing device 31. FIG. 2 shows the function extending apparatus 30 and the information processing device 31 in a separated state and FIG. 3 is a diagram showing the apparatus 30 and the device 31 in a mounted state.

For the sake of convenience, the information processing device 31 will be explained first. The information processing device 31 is comprised of a main body 32 including a keyboard (not shown) on its upper surface and a liquid crystal display panel portion 33 which may be opened as indicated by dotted lines show in FIG. 2. The information processing device 31 may be used singularly, as mentioned above, and is mounted on and electrically connected to the function extending apparatus 30 when necessary.

Figure 4:
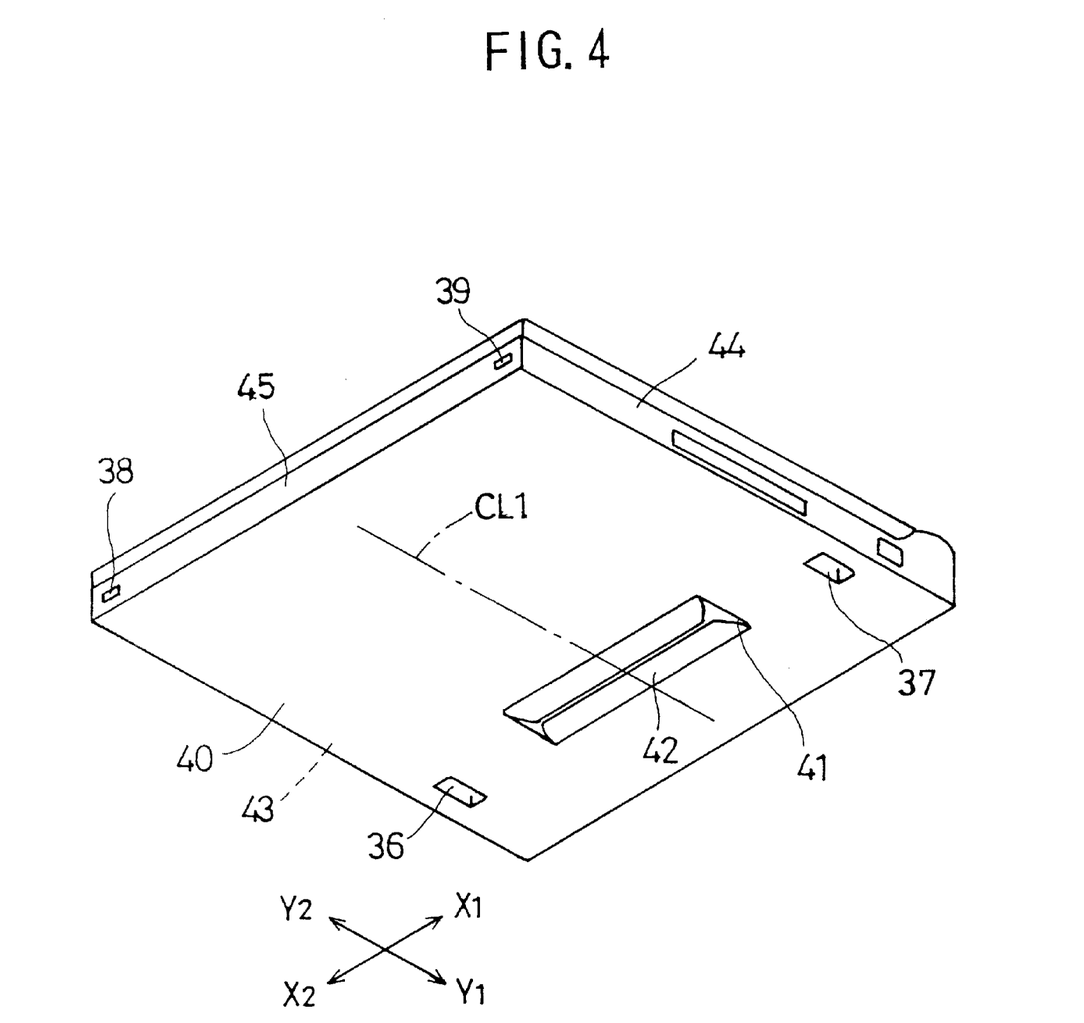
FIG. 4 is a diagram showing a perspective view of the information processing device from the bottom.

The main body 32 of the information processing device 31 is provided with a connector 35, openings 36 and 37, and concave portions 38 and 39 for connection to the function extending apparatus 30 as shown in FIG. 4.

The connector 35 is fixed in the main body 32 in a position shifted a little in a Y1 direction from the center and opposing an opening 41 provided on a lower surface 40 of the main body 32. The longer axis of the connector 35 is aligned with an X1–X2 direction as shown in FIG. 2. As shown in the lower circle in FIG. 2, a cover 42 is provided for the opening 41 in order to protect the connector 35. The cover 42 is closed when the function extending apparatus 30 is not connected to the connector 35 and is opened by a connector 57 of the apparatus 30 (to be described later) when the information processing device 31 is mounted on the apparatus 30.

Figures 2, 2A, 2B:
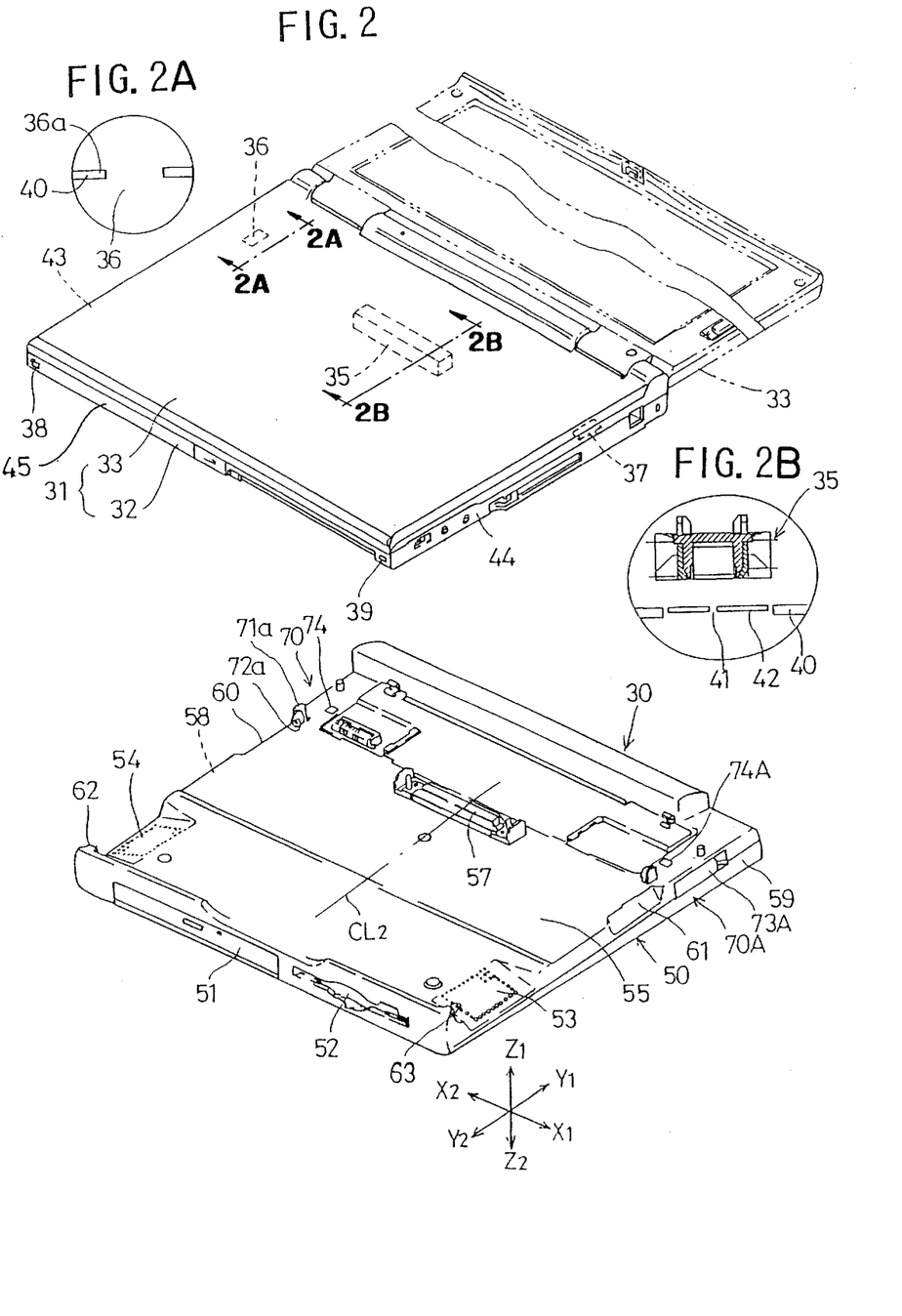
FIG. 2 is a diagram showing a function extending apparatus according to the present invention and an information processing device in a separated state.
FIG. 2A is an enlarged view of an opening shown in FIG. 2, taken along line 2A—2A.
FIG. 2B is an enlarged, cross-sectional view of the connector shown in FIG. 2, taken along line 2B—2B.

The opening 36 is located on the lower surface 40 of the main body 32 in a position close to a side surface 43 of the main body 32 as shown in FIG. 2. Likewise, the opening 37 is located on the lower surface 40 in a position close to a side surface 44, opposing the side surface 43, of the main body 32.

A hook portion 36a, which is a part of the lower surface 40, is formed on the periphery of the opening 36 as shown in the upper circle in FIG. 2. Likewise, a hook portion (not shown), which is a part of the lower surface 40, is formed on the periphery of the opening 37.

The concave portions 38 and 39 are provided on a front surface 45 of the main body 32 in a position close to the side surfaces 43 and 44, respectively.

That is, the center of the connector 35 of the information processing device 31 is aligned with a center line, CL1, shown in FIG. 4 and the openings 36 and 37 and the concave portions 38 and 39, respectively, are located symmetrically with respect to the center line CL1.

Next, the function extending apparatus 30 according to the present invention will be described.

As shown in FIG. 2, the function extending apparatus 30 includes a body 50 which is comprised of a CD-ROM drive 51, a floppy disk drive 52, speakers 53 and 54, the connector 57, etc. A connector (not shown) may be located on a back side surface of the body 50 and the connector 57 is positioned on an upper surface 55 of the function extending apparatus.

The connector 57 is located in a position shifted a little in the Y1 direction from the center of the body 50 and projects from the upper surface 55 of the body 50 in a Z1 direction. The center of the connector 57 of the function extending apparatus 30 is aligned with a center line, CL2, extending in the Y1–Y2 direction as shown in FIG. 2.

Also, detachment mechanisms 70 and 70A are located close to side surfaces 58 and 59, respectively, of the body 50. The detachment mechanisms 70 and 70A are provided symmetrically with respect to the center line CL2.

Figures 3, 3A, 3B:
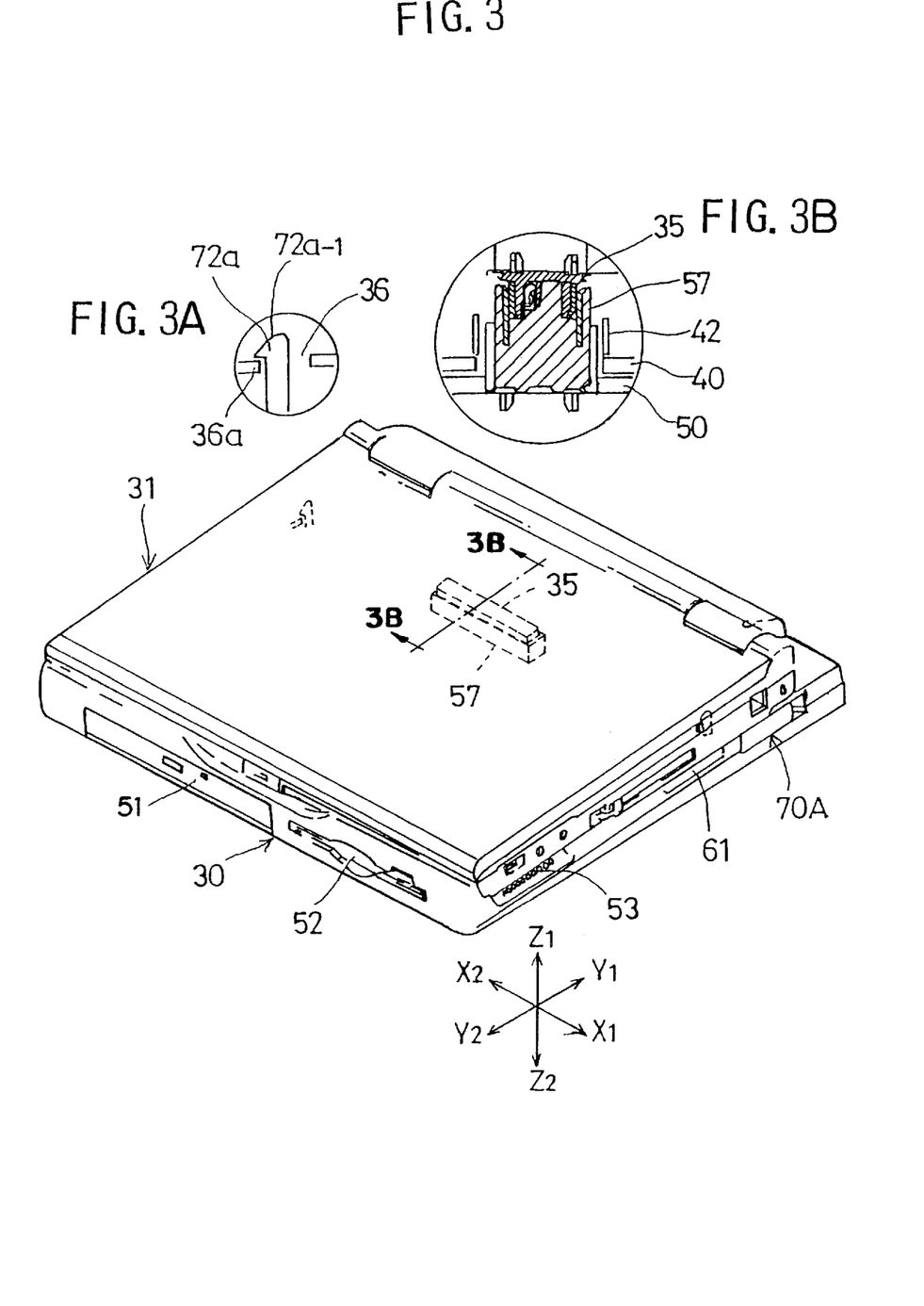
FIG. 3 is a diagram showing the function extending apparatus according to the present invention and the information processing device in a mounted state.
FIG. 3A is an enlarged view of a hook arrangement shown in FIG. 3.
FIG. 3B is an enlarged cross-sectional view of cooperative connectors shown in FIG. 3, taken along line 3B—3B.

As shown in FIG. 3, when the information processing device 31 is mounted on the function extending apparatus 30, the connector 35 of the device 31 is connected to the connector 57 of the apparatus 30 and the function of the device 31 may be extended. Thus, the CD-ROM drive 51 or the floppy disk drive 52 provided with the function extending apparatus 30, for example, may be used with the information processing device 31.

According to the embodiment of the present invention, when the function extending apparatus 30 is separated from the information processing device 31, the detachment mechanisms 70 and 70A may be operated so that the device 31 is pushed up from the apparatus 30 by the mechanisms 70 and 70A and separated from it easily (to be described later).

Next, the detachment mechanisms 70 and 70A according to the present invention will be described.

Figure 5:
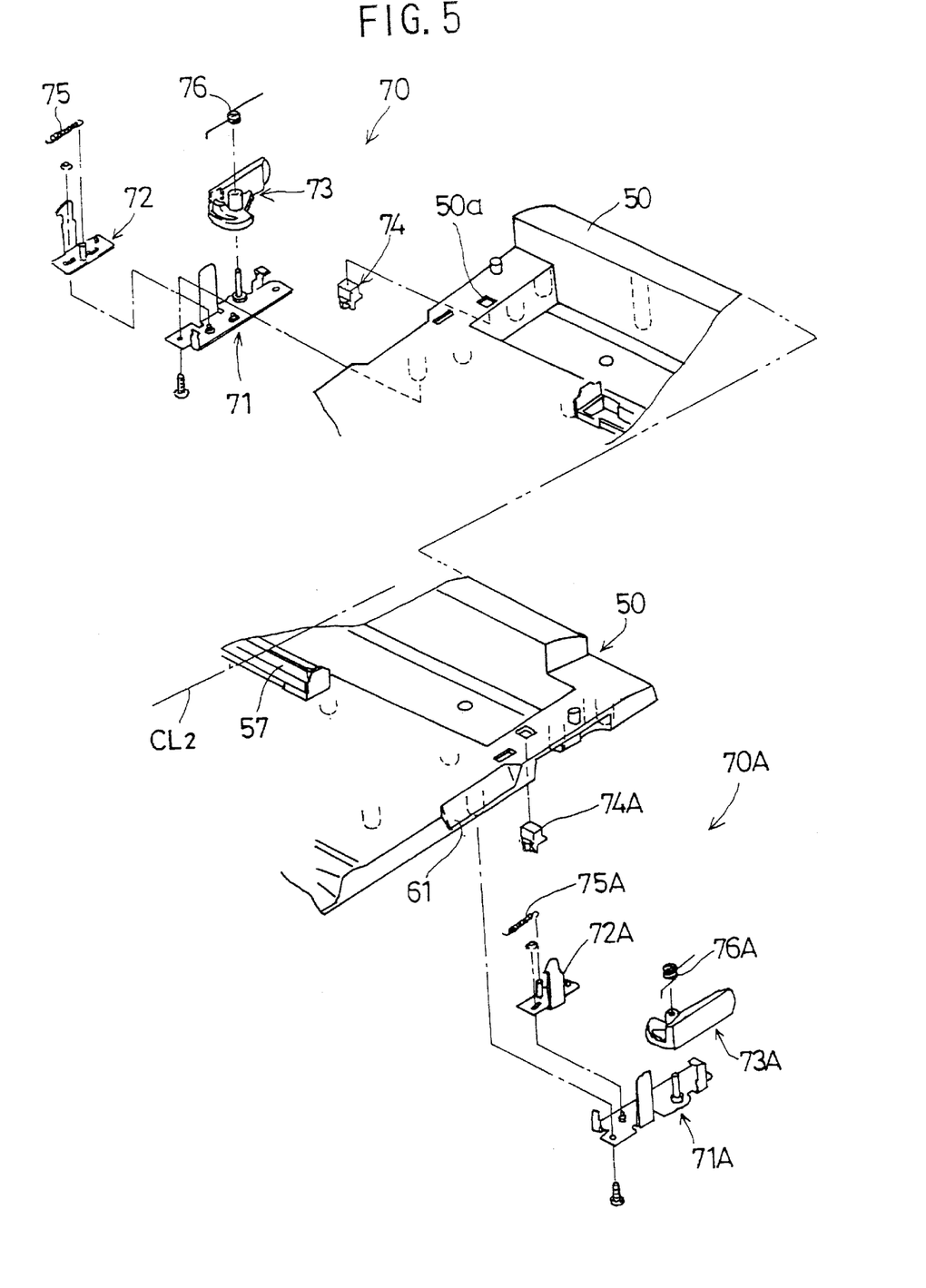
FIG. 5 is a diagram showing an exploded view of detachment mechanisms according to the present invention.

FIG. 5 is a diagram showing an exploded view of the detachment mechanisms 70 and 70A. As shown in FIG. 5, the detachment mechanism 70 is comprised of a base 71, a locking hook member 72, a lever member 73, a pushing member 74, a tensile coil spring 75 and a torsion coil spring 76. The detachment mechanism 70A is comprised of a base 71A, a locking hook member 72A, a lever member 73A, a pushing member 74A, a tensile coil spring 75A and a torsion coil spring 76A. It is clear from the figure that the structure of the detachment mechanisms 70 and 70A are symmetrical with respect to the center line CL2. Thus, an explanation will be made only for the detachment mechanism 70 for simplifying the explanation with reference to FIGS. 6 through 8.

Figure 6:
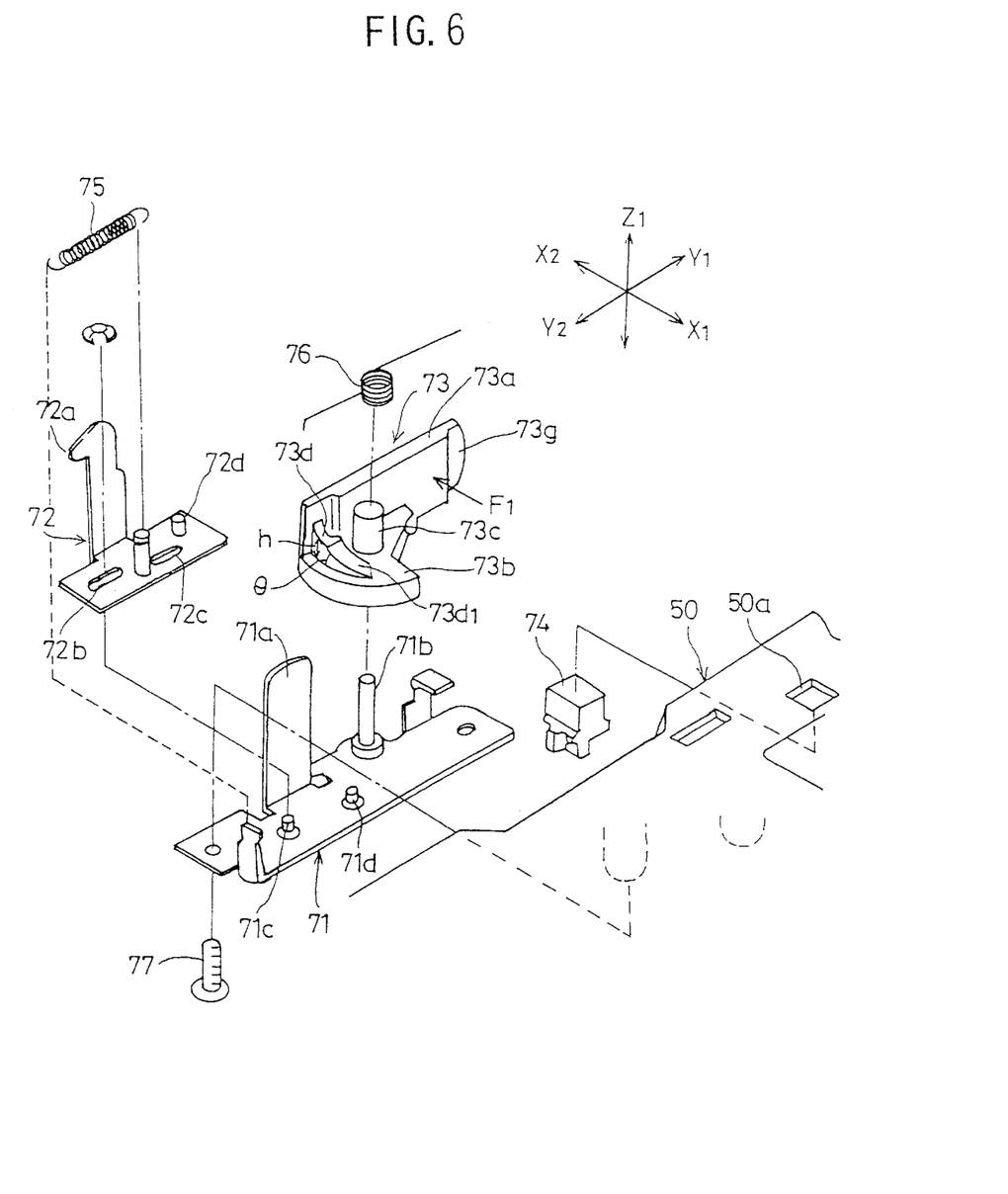
FIG. 6 is a diagram showing an exploded view of the detachment mechanism in a magnified scale

FIG. 6 is a diagram showing an exploded view of the detachment mechanism 70 in a magnified scale.

The base 71 may be made of a metal plate and has an elongated structure extending in the Y1–Y2 direction. The base 71 includes a guiding portion 71a and pins 71b, 71c and 71d.

The locking hook member 72 may also be made of a metal plate and includes a locking hook 72a and a pin 72d. Also, elongated holes 72b and 72c extending in the Y1–Y2 direction, respectively, are provided in positions corresponding to the positions of the pins 71c and 71d of the base 71. The locking hook member 72 is pulled in the Y2 direction due to a force exerted by the tensile coil spring 75.

The lever member 73, which is an operating member according to the present invention, will be described in detail later with reference to FIGS. 8A and 8B.

In FIG. 6, the numeral 74 indicates a pushing member which is moved in the Z1 direction and is projected from an opening hole 50a so as to push up the information processing device 31 when the lever member 73 is operated.

Figure 7A:
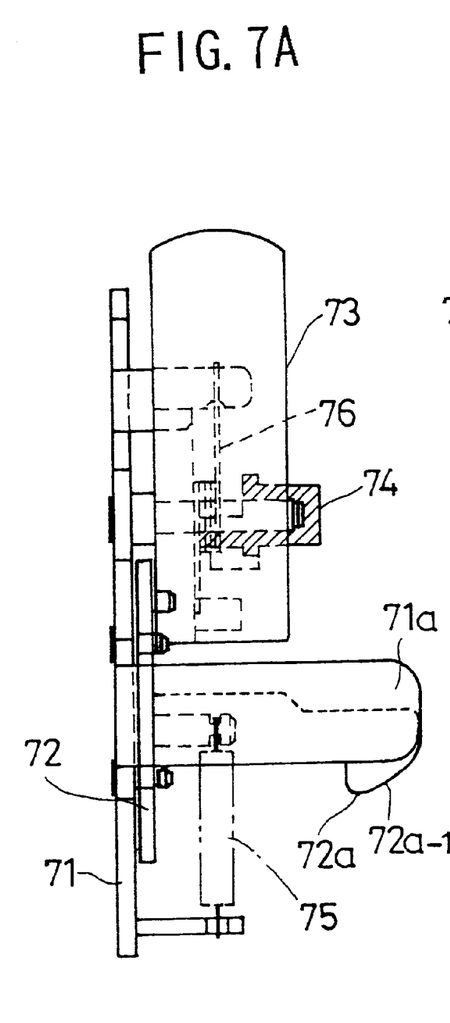
FIG. 7A is a diagram showing a side view of the detachment mechanism in an initial state.
Figure 7B:
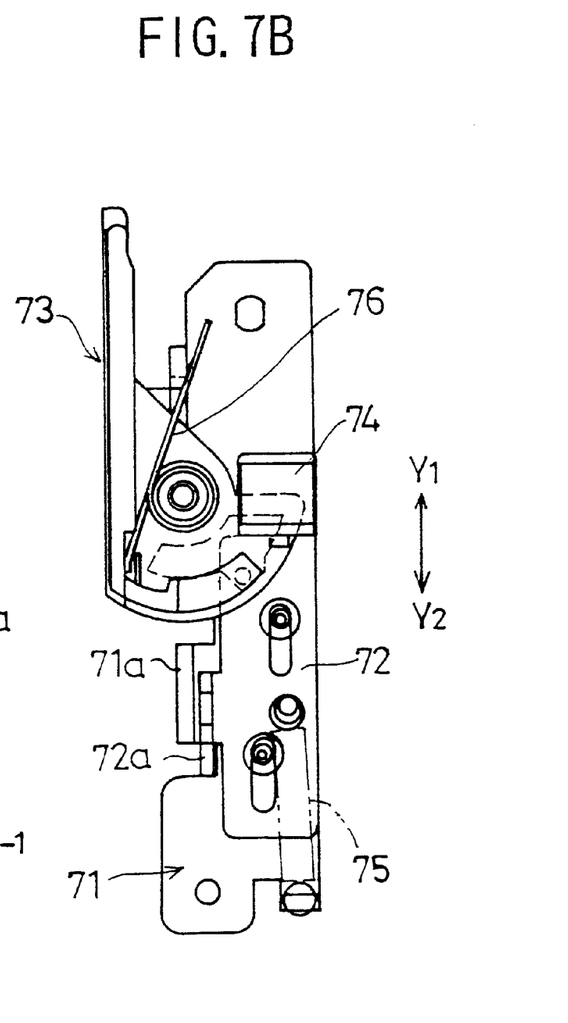
FIG. 7B is a diagram showing a top view of the detachment mechanism in the initial state.

FIGS. 7A and 7B are diagrams showing an initial state of the combined detachment mechanism 70. FIG. 7A is a diagram showing a side view of the detachment mechanism 70 and FIG. 7B is a diagram showing a top view of the detachment mechanism 70.

As shown in FIG. 7A, the locking hook 72a of the locking hook member 72 is projected from the guiding portion 71a of the base 71 in the Y2 direction. When the locking hook member 72 is pulled in the Y1 direction (this operation may be connected to the operation of the lever member 73), the locking hook 72a is located just behind the guiding portion 71a (refer to FIG. 10A) so that the locking of the function extending apparatus 30 to the information processing device 31 is released. That is, the locking hook 72a and the tensile coil spring 75 form a locking mechanism.

Figure 8A:
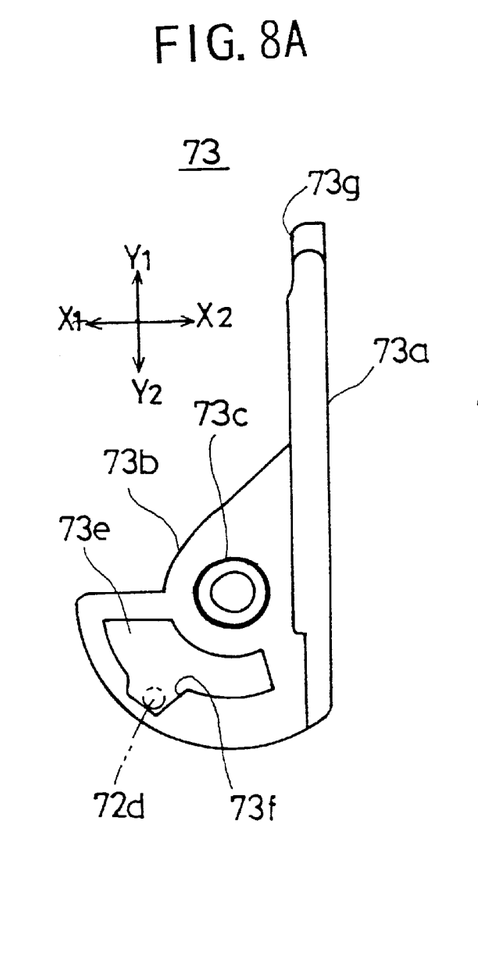
FIG. 8A is a diagram showing a bottom view of a lever member according to the present invention.
Figure 8B:
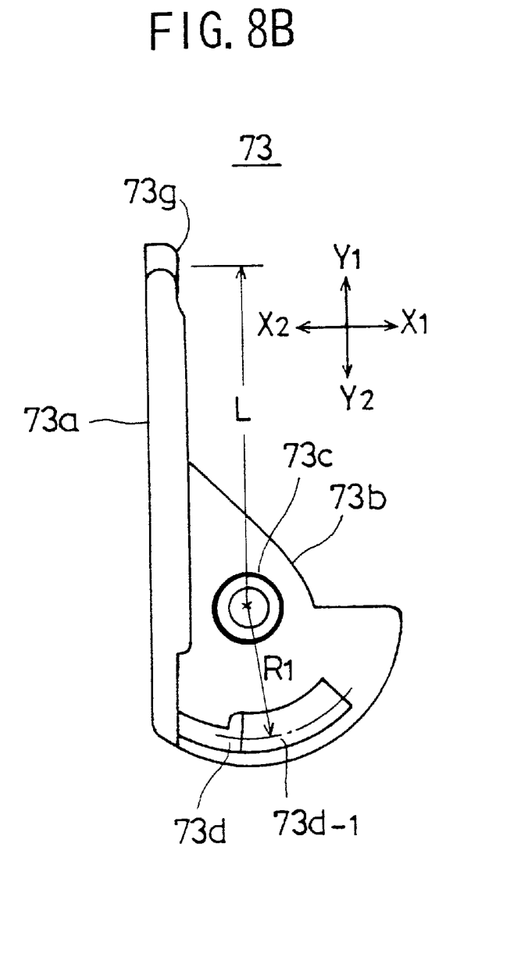
FIG. 8B is a diagram showing a top view of the lever member shown in FIG. 8A.

FIGS. 8A and 8B are diagrams showing the lever member 73 according to an embodiment of the present invention. FIG. 8A shows a bottom view of the lever member 73 and FIG. 8B shows a top view of the lever member 73.

The lever member 73 may be made of a resin having an excellent movability and strength such as polyacetal resin. As shown in FIGS. 8A and 8B, the lever member 73 is comprised of a lever portion 73a, a rotary portion 73b extending from the lever portion 73a, a boss 73c projecting from the rotary portion 73b in the Z1 direction as shown in FIG. 6, a pushing cam 73d provided on the rotary portion 73b, a concave portion 73e located on a lower surface of the rotary portion 73b, a locking release cam 73f formed by the periphery of the concave portion 73e, and a finger-put portion 73g located at the other end of the lever portion 73a. The pushing cam 73d forms a pushing-up mechanism and the locking release cam 73f and the pin 72d form a locking release mechanism.

The pushing cam 73d may have a concave arc shape, in which its height is gradually increased towards the lever portion 73a. The pushing cam 73d has a radius of R1 with the boss 73c as a center as shown in FIG. 8B and includes a slope portion 73d-1 having an inclined angle θ (refer to FIG. 6) of about 20 degrees. On the other hand, the length, L, between the boss 73c and the finger-put portion 73g of the lever portion 73a is about twice as long as the above-mentioned radius R1. Thus, a strong force F2 in the Z1 direction may be applied to the pushing member 74 by pulling the finger-put portion 73g towards outside of the function extending apparatus 30 with a gentle force F1.

The concave portion 73e allows the pin 72d, and hence the locking hook member 72 to move in the Y1 direction when the above-mentioned finger-put portion 73g is pulled towards outside of the function extending apparatus. Thus, the locking hook 72a of the locking hook member 72 is moved in the Y1 direction and the locking of the function extending apparatus 30 to the information processing device 31 is released when the lever portion 73a is rotated about 40 degrees.

The lever member 73 is rotatably supported by the shaft 71b in a state in which the shaft 71b is inserted in the boss 73c and the pin 72d is engaged in the concave portion 73e. The lever portion 73a of the lever member 73 is pushed in a clockwise direction by the torsion coil spring 76 and contacts a part of the base 71, and hence the rotation of the lever member 73 in the clockwise direction is restricted. The lever portion 73a extends in the Y1 direction in the initial condition and the pin 72d of the locking hook member 72 contacts the locking release cam 73f.

The pushing member 74 may be made of resins such as polyacetal resin and may have a substantially cubic shape as shown in FIG. 6. The pushing member 74 is provided in the rectangular opening hole 50a formed in the body 50 of the function extending apparatus 30 so that it may be projected through the opening hole 50a in the Z1 direction (in other words, movable in the Z1–Z2 direction).

The locking hook member 72 and the base 71, combined with the lever member 73, may be fixed on the lower surface of the body 50 using a screw 77. The pushing member 74 is located in a position corresponding to the rotation of the rotary portion 73b as shown in FIG. 7B.

Figure 9A:
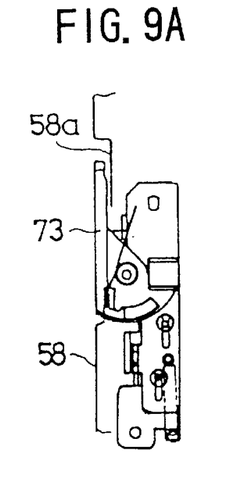
FIG. 9A is a diagram showing an initial state of the detachment mechanism according to the present invention.
Figure 9B:
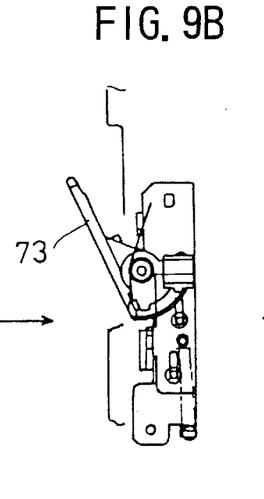
FIG. 9B is a diagram showing a state of the detachment mechanism in which the lever member is rotated about 40 degrees in the anti-clockwise direction from the initial state.
Figure 9C:
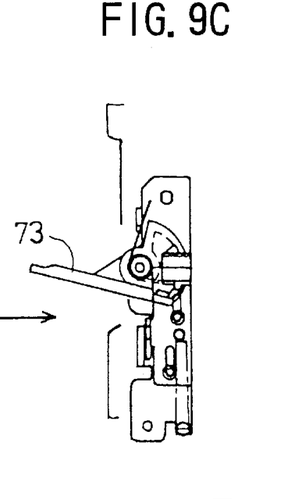
FIG. 9C is a diagram showing a state of the detachment mechanism in which the lever member is rotated about 80 degrees in the anti-clockwise direction from the initial state.
Figure 9D:
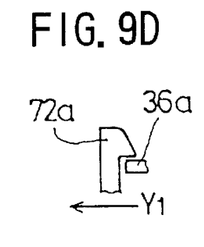
FIG. 9D is a diagram showing a state of a locking hook in relation to a hook portion when the detachment mechanism is in the initial state.
Figure 9E:
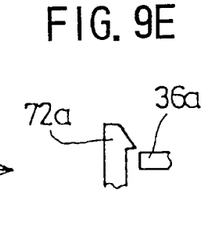
FIG. 9E is a diagram showing a state of the locking hook in relation to the hook portion when the lever member of the detachment mechanism is rotated about 40 degrees in the anti-clockwise direction from the initial state.
Figure 9F:
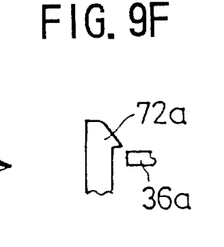
FIG. 9F is a diagram showing a state of the locking hook in relation to the hook portion when the lever member of the detachment mechanism is rotated about 80 degrees in the anti-clockwise direction from the initial state.
Figure 9G:
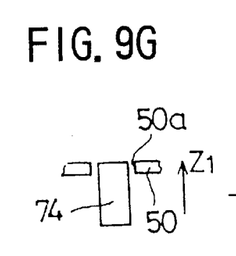
FIG. 9G is a diagram showing a state of a pushing member in relation to an opening when the detachment mechanism is in the initial state.
Figure 9H:
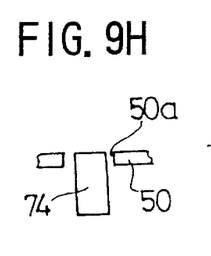
FIG. 9H is a diagram showing a state of the pushing member in relation to the hook portion when the lever member of the detachment mechanism is rotated about 40 degrees in the anti-clockwise direction from the initial state.
Figure 9I:
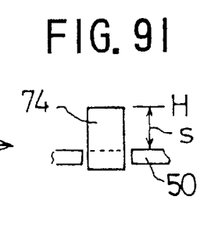
FIG. 9I is a diagram showing a state of the pushing member in relation to the hook portion when the lever member of the detachment mechanism is rotated about 80 degrees in the anti-clockwise direction from the initial state.

The lift, h, shown in FIG. 6, of the above-mentioned pushing cam 73d may be determined so that the maximum pushing-up height, H, achieved by the pushing member 74 (i.e., a stroke, S, of the pushing member 74 in the Z1 direction) is sufficient for detaching the connector 35 of the information processing device 31 from the connector 57 of the function extending apparatus 30 (refer to FIG. 9I).

Next, an operation of the detachment mechanism 70 when the function extending apparatus 30 is separated from the information processing device 31 will be explained. As mentioned above, since the operation of the detachment mechanism 70A is substantially the same as that of the detachment mechanism 70, the explanation thereof will be omitted.

FIGS. 9A through 9L are diagrams for explaining the above-mentioned operation of the detachment mechanism 70 with respect to the rotary position of the lever member 73.

FIGS. 9A, 9D, 9G and 9J are diagrams showing an initial state of the detachment mechanism 70 where the information processing device 31 is mounted on the function extending apparatus 30.

Figure 9J:
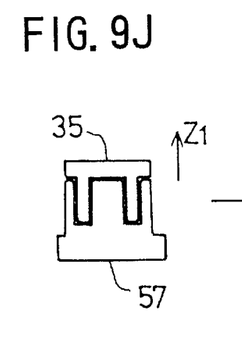
FIG. 9J is a diagram showing a state of a connector of an information processing device in relation to a connector of a function extending apparatus according to the present invention when the detachment mechanism is in the initial state.

As shown in FIG. 9A, the lever portion 73a of the lever member 73 extends in the Y1 direction and is located in a concave portion 58a provided on the side surface 58 of the function extending apparatus 30. In FIG. 9D, it is shown that the locking hook 72a is engaged with the hook portion 36a of the opening 36 formed in the lower surface 40 in the initial state. As shown in FIG. 9G, the pushing member 74 is located at a lowest position at this stage and is not projected from the opening hole 50a of the body 50. Finally, as shown in FIG. 9J, the connector 35 of the information processing device 31 is in a connected state to the connector 57 of the function extending apparatus 30.

When the information processing device 31 is separated from the function extending apparatus 30, an operator is not required to forcibly detach them. Instead, the operator may put his/her right hand on the right-hand side of the function extending apparatus 30 and left hand on the left-hand side of the apparatus 30 and put his/her right and left index fingers on the finger-put portions 73g of the detachment mechanism 70 (70A), respectively, and pull the lever portion 73a gently at the same time towards the Y2 direction until the lever portion 73a of the lever member 73 is no longer rotated (about 80 degrees is maximum in this embodiment).

FIGS. 9B, 9E, 9H and 9K are diagrams showing a state of the detachment mechanism 70 in which the lever member 73 is rotated about 40 degrees in the counter-clockwise direction from the initial state. The detachment mechanism 70 in this state is also shown in FIGS. 10A and 10B in detail. FIG. 10A is a diagram showing a side view of the detachment mechanism 70 and FIG. 10B is a diagram showing a top view of the detachment mechanism 70.

As shown in FIG. 9B, when the lever member 73 is rotated about 40 degrees, the locking release cam 73f of the lever member 73 pulls the pin 72d of the locking hook member 72, and the locking hook member 72 is moved in the Y1 direction against the force exerted by the tensile coil spring 75. Thus, as shown in FIG. 9E, the locking hook 72a of the locking hook member 72 is disengaged from the hook portion 36a of the opening 36 and the locking of the function extending apparatus 30 with the information processing device 31 is released.

Figure 9K:
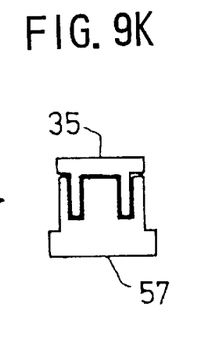
FIG. 9K is a diagram showing a state of the connector of the information processing device in relation to the connector of the function extending apparatus when the lever member of the detachment mechanism is rotated about 40 degrees in the anti-clockwise direction from the initial state.
Figure 9L:
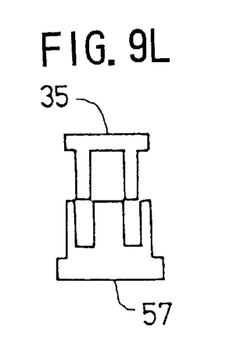
FIG. 9L is a diagram showing a state of the connector of the information processing device in relation to the connector of the function extending apparatus when the lever member of the detachment mechanism is rotated about 80 degrees in the anti-clockwise direction from the initial state.
Figures 10A, 10B:
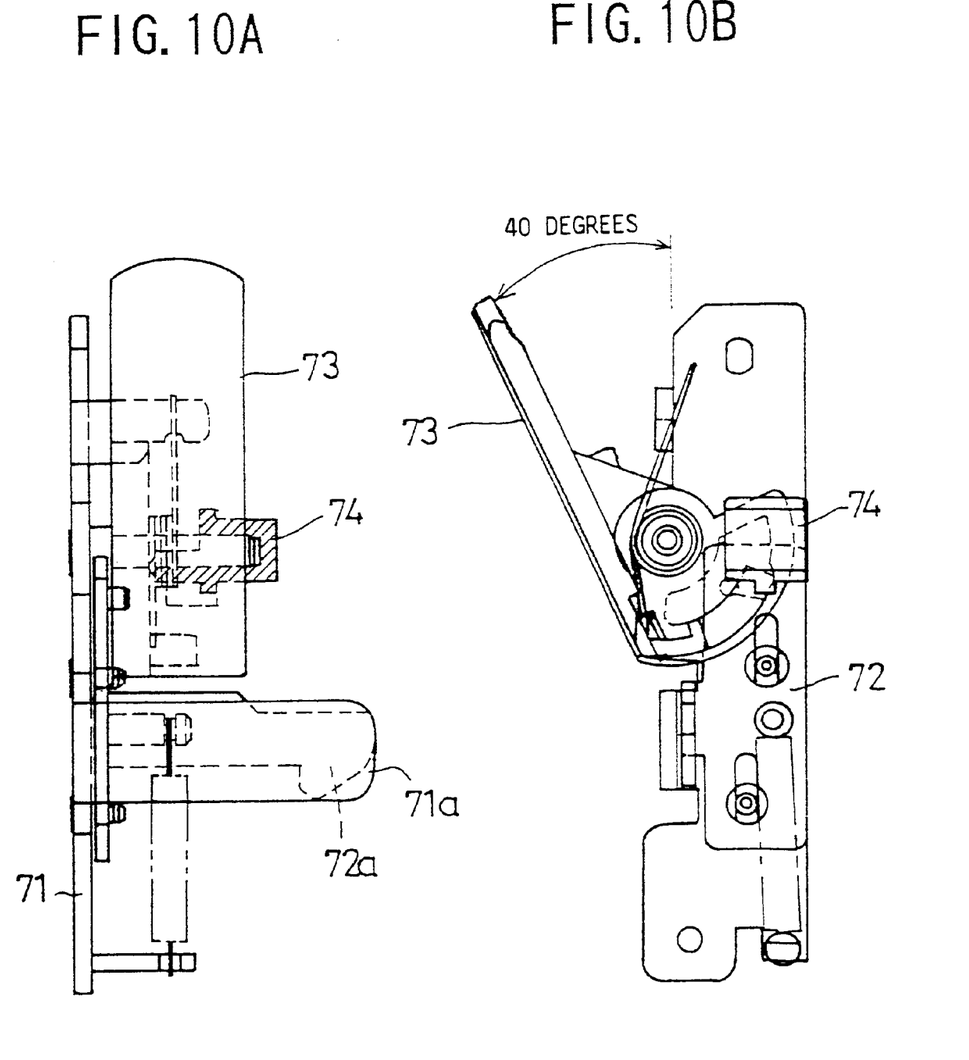
FIG. 10A is a diagram showing a side view of the detachment mechanism when the lever member of the detachment mechanism is rotated about 40 degrees in the anti-clockwise direction from the initial state.
FIG. 10B is a diagram showing a top view of the detachment mechanism when the lever member of the detachment mechanism is rotated about 40 degrees in the anti-clockwise direction from the initial state.

At this stage, since the pushing cam 73d of the lever member 73 has not reached a position underneath the pushing member 74, the pushing member 74 may be located at the lowest (or lower) position as shown in FIG. 9H, and hence the connector 35 of the information processing device 31 is still in the connected state to the connector 57 of the function extending apparatus 30 as shown in FIG. 9K.

Figures 11A, 11B:
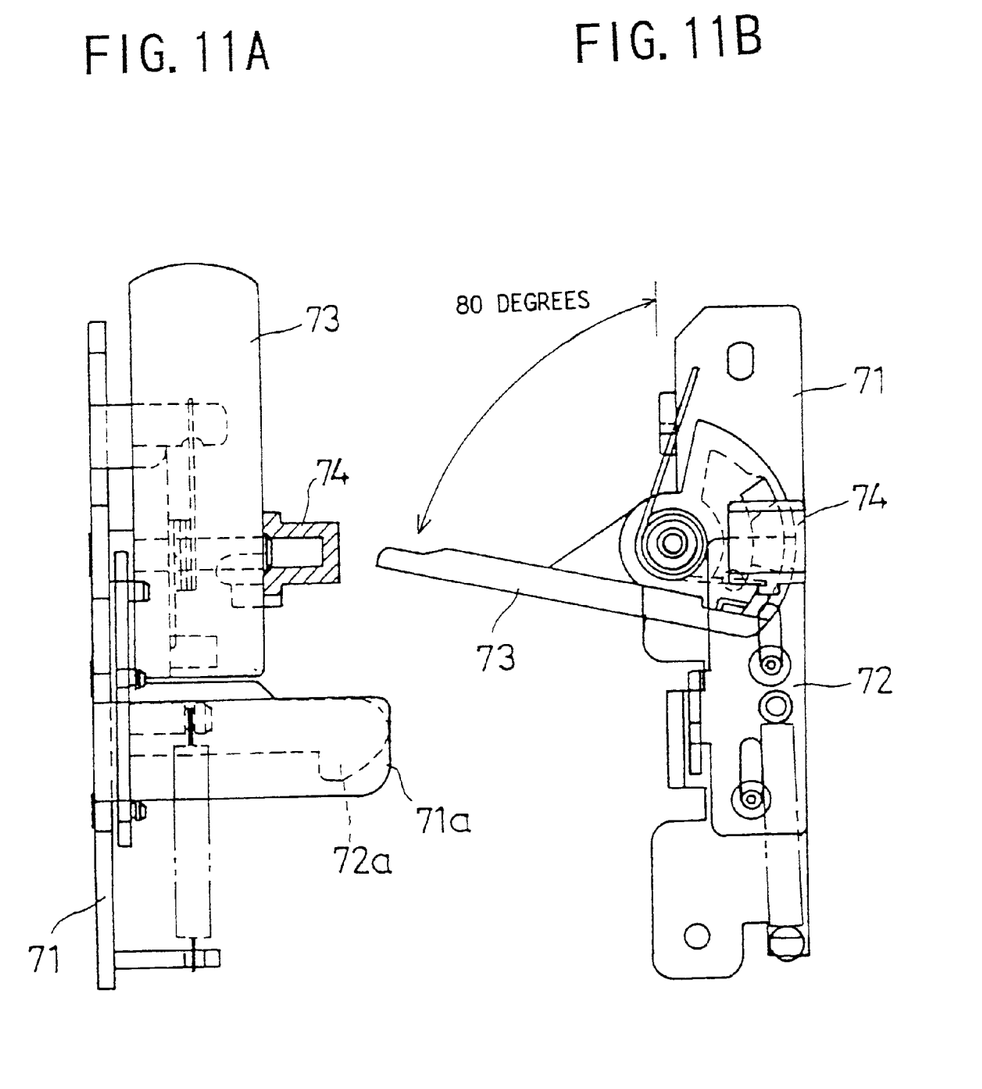
FIG. 11A is a diagram showing a side view of the detachment mechanism when the lever member of the detachment mechanism is rotated about 80 degrees in the anti-clockwise direction from the initial state.
FIG. 11B is a diagram showing a top view of the detachment mechanism when the lever member of the detachment mechanism is rotated about 80 degrees in the anti-clockwise direction from the initial state.

FIGS. 9C, 9F, 9I and 9L are diagrams showing state of the detachment mechanism 70 in which the lever member 73 is further rotated about 40 degrees (80 degrees in total). The detachment mechanism 70 in this state is also shown in FIGS. 11A and 11B in detail. FIG. 11A is a diagram showing a side view of the detachment mechanism 70 and FIG. 11B is a diagram showing a top view of the detachment mechanism 70.

As shown in FIG. 9C, when the lever member 73 is further rotated about 40 degrees, the slope portion 73-1 of the pushing cam 73d starts moving to the position below the pushing member 74 and pushes up the pushing member gradually in the Z1 direction. Hence, the pushing member 74 is projected through the opening hole 50a of the body 50 and reaches a highest position as shown in FIG. 9I. At this stage, on the other hand, since no change occurs for the locking hook member 72, the unlocking state is maintained as shown in FIG. 9F.

Since the locking state is released and the pushing member 74 is projected in the Z1 direction, the information processing device 31, which is mounted on the function extending apparatus 30, is pushed by the pushing member 74 and the connector 35 of the information processing device 31 may be disconnected from the connector 57 of the function extending apparatus 30.

At this stage, an operator may put his/her finger into a space between the information processing device 31 and the function extending apparatus 30 and hold up the information processing device 31. In this manner, an operator may easily separate the information processing device 31 from the function extending apparatus 30. The operation is very simple and there is no danger that the connector 35 of the information processing device 31 and the connector 57 of the function extending apparatus 30 are damaged since no strong force is applied.

Note that inclined surfaces 60 and 61 are provided with the function extending apparatus 30 as shown in FIG. 2 so that an operator may easily put his fingers underneath the information processing device 31.

Also, the force F2 in the Z1 direction of the pushing member 74 is about five times stronger than the force F1 necessary for rotating the lever member 73. Thus, the force F2 sufficient for disconnecting the connector 35 of the information processing device 31 from the connector 57 of the function extending apparatus 30 and for supporting the weight of the information processing device 31 may be obtained from a mild force F1 for rotating the lever member 73. Thus, according to the present invention, an excellent operability of the detaching mechanism may be obtained.

Also, since the force F2 in the Z1 direction of the pushing member 74 is large and two pushing members 74 and 74A are provided so as to push up the positions close to both ends of the connector 35, respectively, of the information processing device 31 at the same time, and the projecting velocity of the pushing member 74 is slow due to the presence of the slope portion 73-1, the pushing force is exerted on the information processing device 31 firmly in a balanced state. Thus, the entire body of the connector 35 may be pulled out evenly from the connector 57 of the function extending apparatus 30 in a stable and a safe condition.

In addition, the information processing device 31 is mounted on the function extending apparatus 30 by engaging the concave portions 38 and 39 of the device 31 with convex portions 62 and 63 of the apparatus 30 with the front of the device 31 lower than the back and then pushing the back of the device 31 in the Z2 direction. In this manner, the connector 35 of the information processing device 31 may be connected to the connector 57 of the function extending apparatus 30 and the information processing device 31 is mounted on the function extending apparatus 30. At this time, the hook portion 36a of the opening 36 provided on the lower surface 40 of the main body 32 pushes a curved surface 72a-1 of the locking hook 72a and the locking hook member 72 is moved a little in the Y1 direction and then is returned in the Y2 direction. When the locking hook member 72 is moved a little in the Y1 direction, the pin 72d is moved inside the concave portion 73e and no movement is generated for the lever member 73 and the state shown in FIG. 9A is maintained. Thus, no discomfort is given to an operator.

Note that the operation of locking/unlocking the locking mechanism is not necessarily dependent on the operation of the lever member 73 and it is possible to provide them separately, or use no locking mechanism according to the present invention.

Also, although the above embodiment is explained for a case in which the lever member 73 is employed as an operation member, any suitable member such as a slide-type lever or a push-type switch may be used instead of the lever member 73 according to the present invention.

Further, it is obvious that the present invention is not limited to the above-mentioned embodiment, and variations and modifications may be made without departing from the scope of the present invention.

What is claimed is:

1. A function extending apparatus for an information processing device, said function extending apparatus comprising:
    at least one connector provided on a mounting surface of an upper part of said function extending apparatus for mounting said information processing device, to be connected with at least one corresponding connector of said information processing device provided on a lower surface of said information processing device, said connector of said function extending apparatus being connected to said connector of said information processing device, when said information processing device is mounted on said function extending apparatus,
    a locking mechanism capable of locking said function extending apparatus to said information processing device,
    an operation member operated to separate said information processing device from said function extending apparatus and rotatably provided at said function extending apparatus so as to be rotated in a plane parallel to a plane of said mounting surface, and
    a locking release mechanism capable of releasing a locking state generated by said locking mechanism, when said operation member is rotated.

2. The function extending apparatus as claimed in claim 1, wherein said operation member has a lever portion which may be pulled in a side direction.

3. The function extending apparatus as claimed in claim 1, wherein the function extending apparatus has two sides and each of the locking mechanism, operation member and locking release mechanism is provided at the two sides of said function extending apparatus.

4. An information processing system, comprising:
    an information processing device having at least one connector provided on a lower surface of said information processing device, and
    a function extending apparatus having
        at least one connector provided on a mounting surface provided on an upper part of said function extending apparatus for mounting said information processing device, to be connected with said connector of said information processing device, said connector of said function extending apparatus being connected to said connector of said information processing device, when said information processing device is mounted on said function extending apparatus,
        a locking mechanism capable of locking said device,
        an operation member operated to separate said information processing device from said function extending apparatus and rotatably provided to said function extending apparatus so as to be rotated in a plane parallel to a plane of said mounting surface, and
        a locking release mechanism which is capable of releasing a locking state generated by said locking mechanism, when said operation member is rotated.

5. The information processing system as claimed in claim 4, wherein said operation member has a lever portion which may be pulled in a side direction.

6. The information processing system as claimed in claim 4, wherein the function extending apparatus has two sides, and each of the locking mechanism, operation member and locking release mechanism is provided at the two sides of said function extending apparatus.

* * * * *